United States Patent Office 3,841,976
Patented Oct. 15, 1974

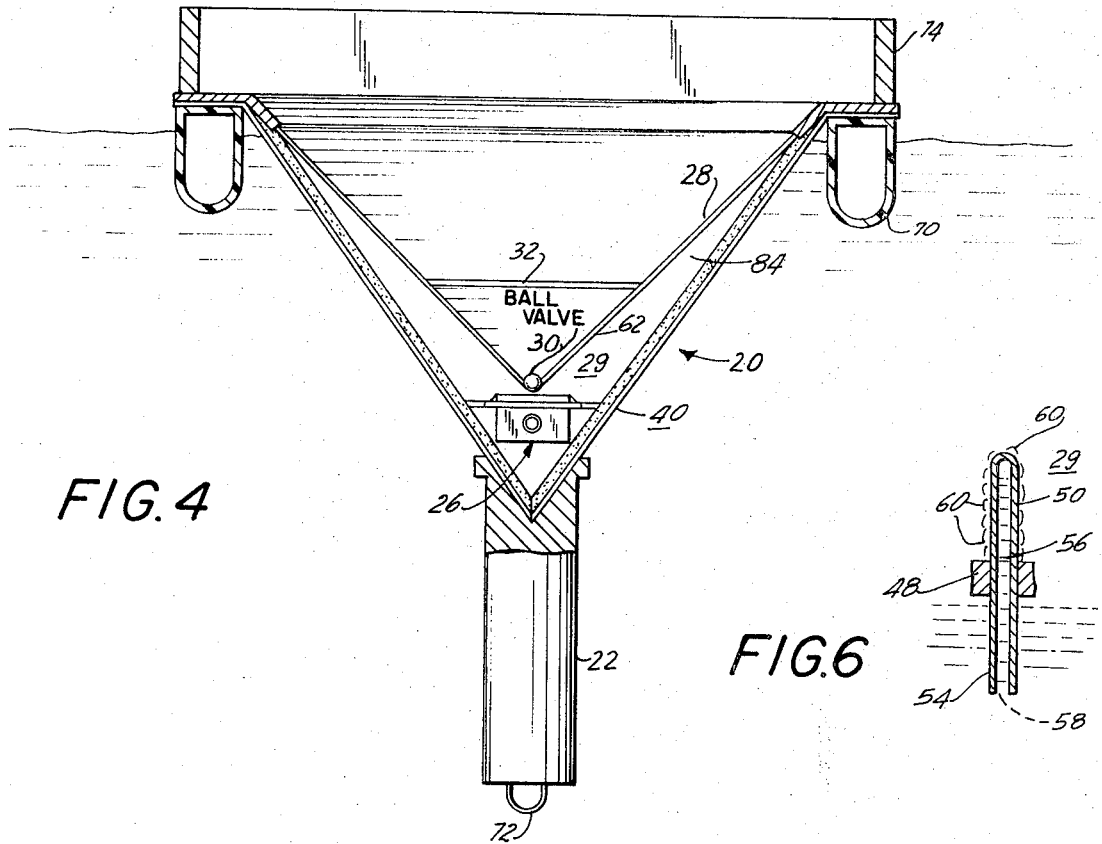
FIG. 4
FIG. 6
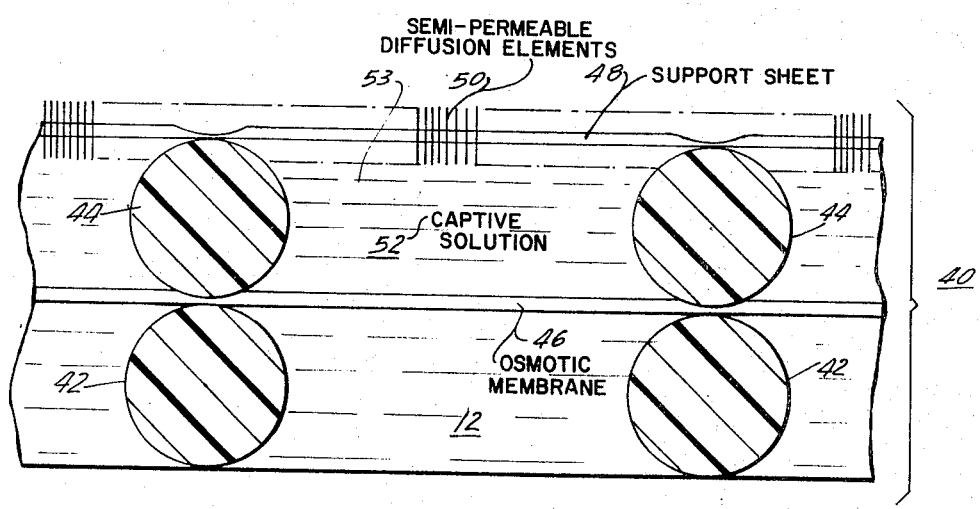
FIG. 5

3,841,976
DISTILLING SEA WATER DIFFUSED THROUGH A MEMBRANE
Harold W. Scott, Ridgefield, Conn., and Russell A. Eversole, Purdy Station, N.Y., assignors to Basic Sciences, Inc., Bethel, Conn.
Filed Nov. 16, 1971, Ser. No. 199,245
Int. Cl. C02b 1/06
U.S. Cl. 202—236
10 Claims

ABSTRACT OF THE DISCLOSURE

A method of distillation and a still for use therein, which includes a concentration of dissolved solids contained in a zone formed by an osmotic membrane and an evaporative surface wherein the evaporative surface cooperates with an evaporator lens to form an evaporation chamber to vaporize thin films of liquid from the evaporative surface by means of heat generated by the absorption of electromagnetic radiation in the region of the absorption spectrum of the liquid. The osmotic membrane contacts a source of liquid having a lesser concentration of dissolved solids so that liquid will pass to the concentrated zone furnishing a continuous supply of liquid to replenish that vaporized at the evaporative surface in the evaporation chamber.

BACKGROUND OF THE INVENTION

This invention relates to a method of distilling liquid, usually water, and a still by which such liquid is separated from certain materials suspended and dissolved in it. More particularly it relates to a method and apparatus whereby heat is generated by the absorption of electromagnetic radiation (EMR) in the region of the absorption spectrum of the liquid, and an evaporative surface are combined and synergistically vaporize thin films of liquid, simply and economically.

The liquid which is primarily the object of the present method and apparatus is water and the hereinafter illustrated embodiment will refer to it.

Heretofore many means have been suggested for desalinizing water so that substantially pure or potable water will be available in areas which do not have sufficient fresh water supplies, but which do have an adequate source of saline or contaminated water. Generally, the usual means of desalination have required high heat, freeze concentration or reverse osmosis. All of these different types of desalinization are well known in the prior art. High heat and freeze concentration systems require a substantial amount of energy in order to operate; and it is believed that the reverse osmosis system has been quite limited in its application primarily due to the necessity of creating a high pressure in order to overcome the natural osmotic pressure in order to obtain large quantities of a pure or potable water. As far as it is known, none of the prior systems have been efficient enough to permit large scale economical installations, particularly as a substitution for other available water systems.

SUMMARY OF THE INVENTION

The present invention seeks to combine the economy of a still with the principles of osmosis, reverse osmosis and diffusion in order to provide a substantially continuous purification system which may operate in an economical and efficient way.

It is well known that if a concentrated supply of water with a high saline content (say about 15 to 20% of dissolved salts such as sodium chloride) is placed on one side of an osmotic membrane and a more dilute saline solution (say about a 3% concentration of dissolved salts) on the other side, the water in the less concentrated solution will pass through the osmotic membrane into the supply of high concentration. When osmotic pressure equalization has taken place on both sides of the osmotic membrane the movement of the water from the less concentrated to the more concentrated will cease.

It is also known that if a solar still is prepared using an evaporator lens over a confined area of water to form an evaporation chamber, solar energy will furnish sufficient heat to evaporate some potable water from the surface of even a saline solution and cause the evaporated moisture to condense on the underside of the evaporator lens. This latter process is slow and extremely inefficient.

It is further known that if a very thin film is exposed to heat energy the amount of heat necessary to drive it from the liquid to the vapor phase is substantially less than that required with a thick film or layer of liquid.

Accordingly, it is an object of the present invention to provide a system wherein substantially pure water may be vaporized, condensed and collected.

It is a further object of the present invention to provide a method of distillation and a still apparatus which may function without any additional heat energy other than that obtained from solar or other forms of radiant energy.

These and other objectives are obtained by means of the present invention whereby a continuous supply of liquid is provided and presented to a large area of an evaporative surface and deposited thereon as thin films in an evaporation chamber permitting economical and efficient condensation of vapor as a purified liquid.

BRIEF DESCRIPTION OF THE DRAWINGS

FIG. 4 is a sectional view of the still unit of FIG. 3 taken along lines 4—4;

FIG. 5 is a sectional view of the liquid transfer means of the present invention; and FIG. 6 is a schematic sectional view of a diffusion filament in accordance with the present invention.

DESCRIPTION OF THE ILLUSTRATED EMBODIMENT

Figure 1:
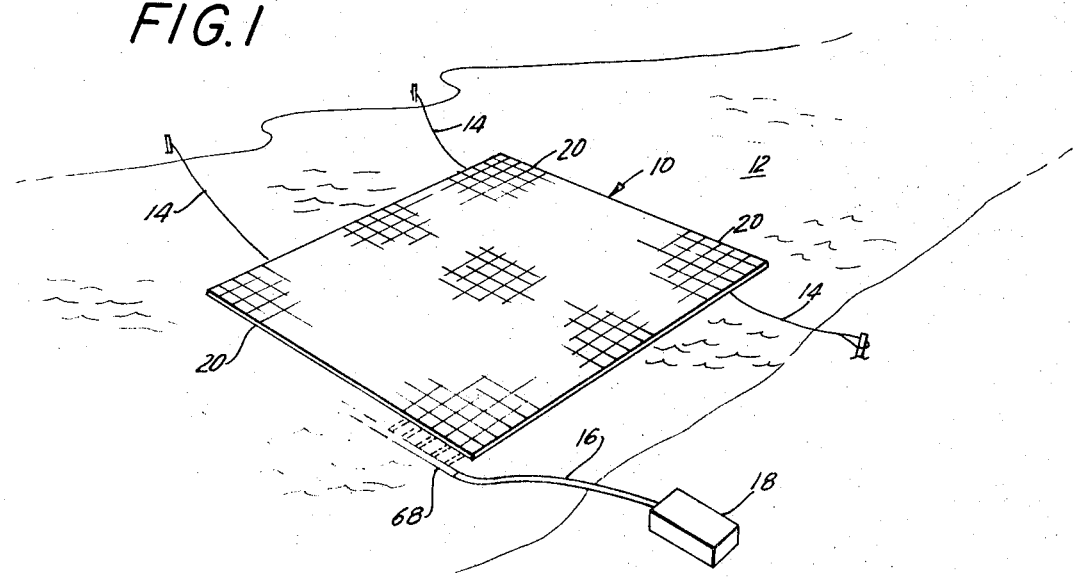
FIG. 1 is a partially plan and perspective view of a schematic showing of a plurality of still units in accordance with the present invention.
Figure 3:
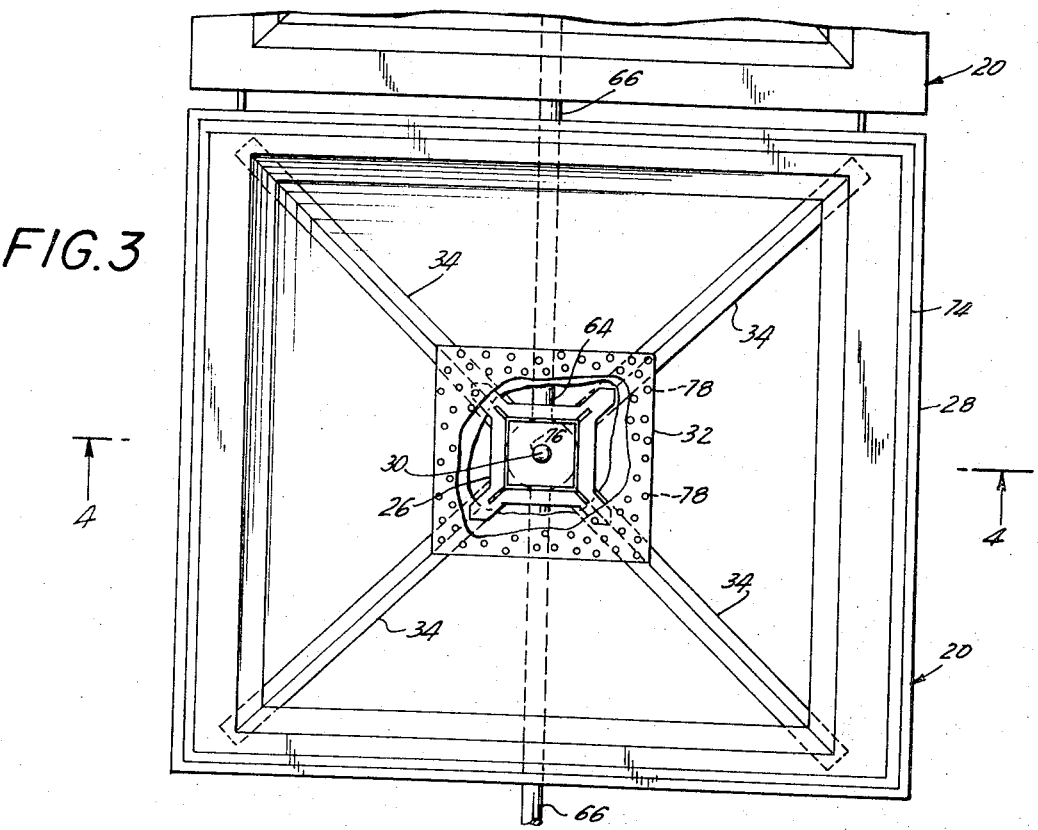
FIG. 3 is a plan view of a still unit in accordance with the present invention.

Referring to the drawings and to FIG. 1 in particular, a still network 10 is shown in place in a suitable water source 12 which may be brackish or saline water such as found in a sea, bay or tidal estuary. In the illustrated embodiment, the still network 10 is held in place by suitable anchors or moorings 14. Condensate from the still network is collected by a conduit 16 which in turn is connected to a pump 18. From the pump 18 the collected condensate may be distributed or stored as desired.

Figure 2:
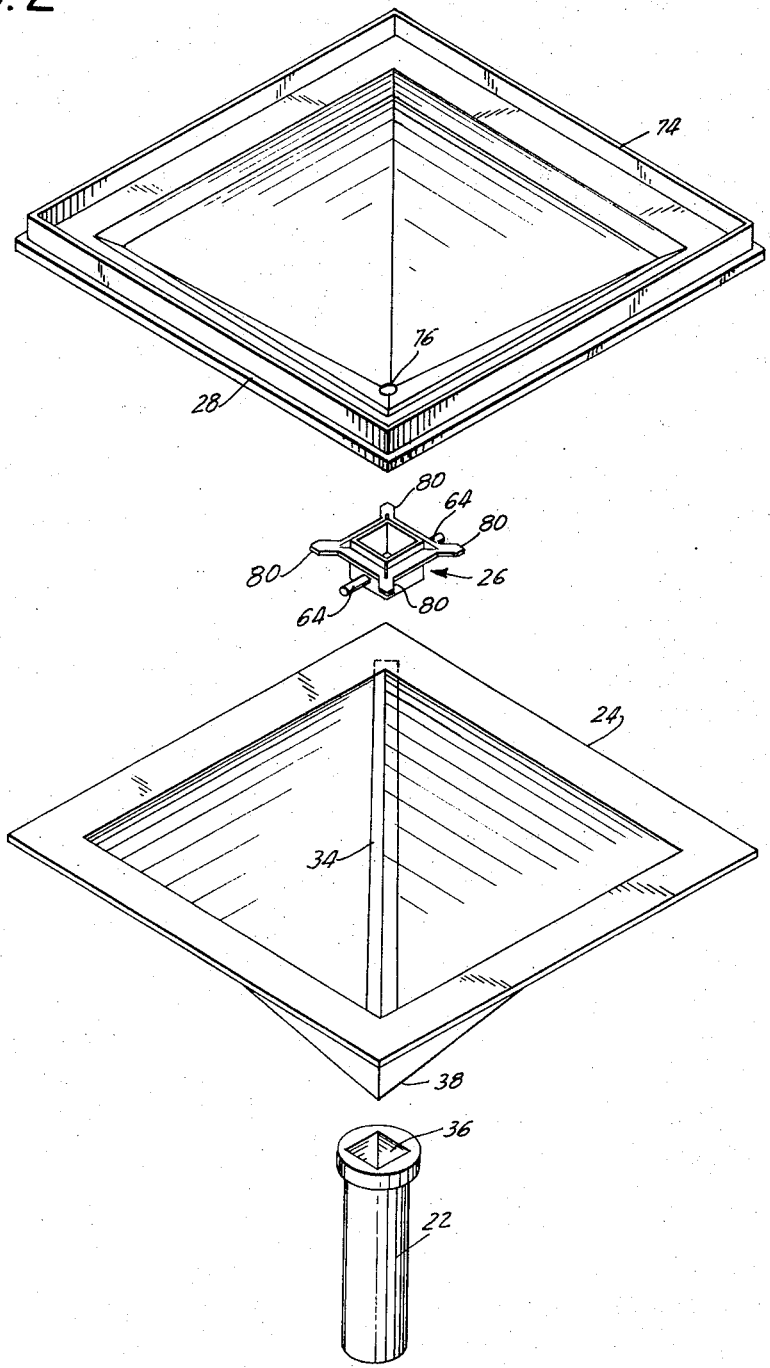
FIG. 2 is an exploded perspective view of the components of a still unit in accordance with the present invention.

The still network 10 is comprised of a number of still units 20. As shown in FIG. 2, the still unit 20 includes a weight 22 which is used to hold the still in place and at the desired depth in the water source 12. An evaporator 24 which will be discussed in further detail hereinafter is fitted onto the weight so that it will be held in a relatively stable position in the water source 12. A condensate collector 26 is placed in the evaporator 24 and an evaporator lens 28 is positioned above the evaporator and the collector.

The lens 28 and the evaporator 24 combine to form an evaporation chamber 29.

Since the still unit 20 will be exposed to the atmosphere and rain water may fall into the cavity formed by the lens (which serves as a collection basin), a ball valve 30 of suitable material, such as buoyant rubber, is permitted to rise when water enters the cavity, thus permitting the rain water to flow into the condensate collector 26. A retainer plate 32 overlies the valve 30 so that it will not float away.

The illustrated evaporator 24 includes an evaporator frame 34 which is in the shape of a tetrahedron in the illustrated embodiment. A frame opening 36 is provided in the weight 22 and the apex 38 of the frame 34 is fitted therein.

The evaporator 24 further includes transfer means 40 which is supported on the frame 34. This transfer means 40 consists of a pair of supporting meshes or grids, 42 and 44, an osmotic membrane 46, a support sheet 48, an evaporative surface in the form of a plurality of diffusion filaments 50 presenting a diffusion surface and a captive solution 52.

The support meshes 42 and 44 may be of any suitable material, such as polypropylene, which is resistant to saline solutions or other concentrated dissolved solids which may be found in the source of liquid being purified. In the illustrated embodiment, the outer mesh 42 is in contact with the water source 12. Normally a salt water source such as 12 would have a salt content of approximately 3%.

The osmotic membrane may be made of any of the well known materials available in the prior art such as cellulose acetate, and it is positioned between the meshes 42 and 44. Overlying the mesh 44 and adhered thereto is a support sheet 48 made of any suitable material such as polyethylene, which will be substantially water tight and resistant to the high saline concentration 52. The support sheet 48 must be capable of supporting the diffusion filaments 50 which are inserted therethrough. The filaments 50 are preferably made from a semi-permeable membrane such as cellulose acetate, microporous hollow fibers sold by Dow Chemical Company of Midland, Mich., under the designation "Cellulose Acetate-a(CA-a)," or the monofilament, permeable hollow fibers sold by E. I. du Pont & Company, Inc., of Wilmington, Del. under the trademark "PERMASER." Normally, the captive solution 52 will have a saline, and/or other dissolved material concentration greater than that of the water source 12, and preferably in the range of 2 to 5 or more times the concentration of the source 12.

The osmotic membrane 46 may be of any thickness which will satisfy the needs of the particular operation. The use of a membrane of about 100 microns thickness is satisfactory if properly supported by meshes 42 and 44 and adhered to the mesh 44. The diffusion filaments 50 may have a configuration as shown in FIG. 6 with a typical filament having an outer diameter of about 100 microns and an inner diameter of approximately 50 microns. The lower half 54 of the filament 50 is in intimate contact with the captive solution 52 while the upper half 56 projects into the evaporation chamber 29.

To those skilled in the art it will be obvious that a loop of material may be inserted through the support sheet 48 so that a simple weaving or sewing technique may be utilized for inserting the filament material. With a simple sine wave placement the loop portions in the captive solution area need only be cut to provide the diffusion filaments.

When the still unit 20 is placed in a water source 12 having a salt content of about 3% and the captive water solution 52 has a salt content of 15 to 20% or greater water from source 12 will migrate through the osmotic membrane 46 by the well-established osmotic principle that a liquid will move from a lesser concentration through such a membrane to a liquid of a higher concentration. This movement of liquid from the source 12 to the captive solution 52 will continue until the pressure within the captive chamber is sufficiently high to prevent further migration. At this point the solution 52 will have been forced through the central passageway 58 of a filament 50 and, it is believed, by diffusion and reverse osmosis due to the increase in pressure within the captive chamber 53, a thin film layer of substantially salt-free water 60 will form on the outer surface of the filament 50 in the evaporation chamber 29. In order to maintain the film 60 in a thin layer on the filaments 50, it is necessary that the thin films 60 be quickly evaporated from the filaments 50. To accomplish this the evaporator lens 28 cooperates with the evaporative surface formed by the support sheet 48 and the filaments 50 to form the evaporation chamber 29.

The evaporator lens 28 is preferably and advantageously made from an acrylic material, such as that sold by Röhm & Haas, of Philadelphia, Pa., under the trademark "Plexiglas." The lens permits the rays of the sun or other EMR to pass therethrough and to provide heat energy in the evaporation chamber 29. Inasmuch as the chamber 29 is a closed area, the heat is concentrated there and acts on the thin film layers 60. Since the thin films have a low surface tension, the amount of heat energy necessary to evaporate the layers is much less than that which would normally be encountered with larger bodies and thicker layers of liquid. As a result, the heat energy contained within the chamber 29 causes the thin film of liquid to evaporate at a fast rate and thereafter condense on the inner surface 62 of the lens 28. As the thin film is evaporated and condensed, the process as described heretofore starting with the migration of liquid or water through the membrane 46 will continue. The condensation on the inner surface 62 will build up until it is sufficient to roll down that surface into the condensate collector 26.

Attached to the condensate collector 26 are stubs 64 which are connected to transfer lines 66 which may be formed of any suitable tubing. The lines 66 in turn are connected to a header 68 which joins the conduit 16 so that the condensed liquid may be pumped from the still network by the pump 18 and distributed or stored.

In order to stabilize the support the still unit 20, a flotation collar 70 may be provided. The flotation collar is shown in the illustrated embodiment as a hollow unit, but it is to be understood that it may be filled with a suitable bouyant material if desired.

If there is a danger of any splashing of the water source 12 into the collection basin of the lens 28, a splash shield 74, preferably also made of acrylic, may be provided. This splash shield 74 will aid in preventing unwanted water from source 12 flowing into the collection basin causing the ball valve 30 to rise from its opening or valve seat 76. It should also be noted that the valve retainer 32 is provided with a number of perforations 78 to insure that rain water will quickly flow to the apex of the collection basin.

The retainer 32 may be made of any suitable open grid material but it is preferably also made of acrylic so that there will be maximum passage of the sun rays into the evaporation chamber 29.

In order to permit the maximum evaporative surface to be presented to the chamber 29, the condensate collector 26 is preferably fitted with spacer arms 80 so that the portion of the evaporative surface beneath the collector 26 may also be effective.

In the illustrated embodiment, the support shaft 48 has not been shown as an evaporative surface itself. However, it is to be understood that, if desired, the sheet 48 may be made of a semi-permeable membrane material so that the composite of the sheet 48 and the filaments 50 will present an entire evaporative surface to the interior of the evaporation chamber 29. In any event, it is the utilization of the large number of filaments which increases many fold the evaporative surface over that which would be available if only an evaporative surface in the form of sheet 48 were presented to the chamber.

It is to be understood that the filaments 50 may be made of any suitable material and of any suitable interior and exterior configuration which will permit the diffusion of liquid in thin films on the surface exposed within the evaporation chamber.

As illustrated, the evaporator lens 28 is comprised of four panels 82 and they are sufficiently translucent to permit the passage of solar rays or other EMR therethrough compatible with the material from which they are made. The panels form an angle 84 with the transfer means 40 which will preferably cause the rays where possible to be refracted so as to strike the evaporative surface substantially perpendicularly. The degree of refraction, of course, will vary with the material involved but such is well known to those skilled in the art.

While the present invention has been described as applied to obtaining substantially pure or potable water from salt water, it may also be applied to other uses. For example, it may be used to treat industrial waste waters containing high concentrations of dissolved contaminants, effluent from domestic sewage plants and wherever there is a concentration of unwanted dissolved or suspended solids. Also, it may be utilized to obtain the concentration of materials in solutions.

What is claimed:

1. A still apparatus adapted to be placed in contact with a source of liquid solvent having a concentration of dissolved solids therein and from which the solvent is to be obtained, said apparatus comprising a frame, means in said frame defining an enclosed chamber and including a first osmotic membrane forming a peripheral portion of said chamber and located in said frame to be in contact with the liquid in said source and a second membrane at least partially formed of an osmotic material defining another peripheral portion of said chamber; and a liquid solution in said chamber having a higher concentration of solids than said source whereby an osmotic pressure is produced causing liquid solvent to pass by osmosis from said source to said chamber creating a pressure therein while the dissolved solids in said source remain in the source; an evaporator lens mounted in said frame opposite said second membrane in position to be exposed to electromagnetic radiation when said first osmotic membrane is in contact with said source and cooperating with said second membrane to form an evaporation chamber wherein said lens evaporates liquid solvent on the side of said second membrane opposite said chamber, whereby said pressure in said chamber forces liquid solvent through the portion of said second membrane formed of an osmotic material by reverse osmosis as said solvent is evaporated and condenses on said lens, and means for collecting the condensed solvent from said lens.

2. The still as defined in claim 1 wherein said second membrane is formed of an osmotic material.

3. The still as defined in claim 1 wherein said second membrane has a plurality of hollow filaments mounted therein, said filaments having hollow end portions extending into said chamber into contact with said higher concentration solution and being formed of osmotic material whereby the reverse osmosis through said second membrane takes place through said filaments.

4. Still apparatus as defined in claim 1 wherein the evaporator lens is formed from an acrylic polymer material.

5. Still apparatus as defined in claim 1 wherein the evaporator lens is disposed at an angle to the evaporative surface whereby the direction of the rays of electromagnetic radiation passing through the evaporator lens are substantially normal to the evaporative surface.

6. Still apparatus as defined in claim 1 wherein said frame is comprised of a plurality of panels joined together to form a structure open at one end, said evaporator lens being positioned in said frame and said condensate collection means being located between said second membrane and said lens.

7. Still apparatus as defined in claim 6 wherein the lens is formed with a depressed central portion overlying the collection means, said collection means having an open upper surface to permit the entry of condensate therein from the evaporator lens.

8. Still apparatus as defined in claim 7 and further including a conduit connected to the collection means whereby the collected condensate may be removed from the still.

9. Still apparatus as defined in claim 1 and further including flotation means to support said still in a floating position in the source of liquid of a lesser concentration of dissolved solids.

10. A still apparatus adapted to be placed in contact with a source of liquid comprising a liquid solvent having a concentration of dissolved solids therein and from which the solvent is to be obtained, said apparatus comprising a frame, first and second osmotic membranes mounted in said frame in predetermined relation to each other to define a chamber therebetween, said first membrane being located in said frame to be in contact with the liquid in said source and said second membrane being located above said first membrane to define said chamber therebetween; a liquid solution in said chamber having a higher concentration of dissolved solids therein than said source whereby an osmotic pressure is produced across said first membrane causing liquid solvent to pass by osmosis from said source to said chamber, creating a pressure in said chamber while the dissolved solids in said source remain in the source, said pressure in said chamber forcing liquid solvent through said second membrane by reverse osmosis to form a liquid solvent film on said side of said second membrane opposite said chamber; an evaporator lens mounted in said frame above said second membrane in position to be exposed to electromagnetic radiation when said first osmotic membrane is in contact with said source and cooperating with said second membrane to define therewith an evaporation chamber wherein said lens evaporates said liquid solvent film on the side of said second membrane opposite said chamber and said evaporated liquid solvent evaporates on said lens, whereby said film of liquid solvent is rapidly removed from said second membrane to permit the reverse osmosis to operate substantially continuously; and means for collecting condensed solvent from said lens.

References Cited

UNITED STATES PATENTS

| | | | |
|---|---|---|---|
| 3,351,538 | 1/1967 | Andrassy | 203—10 |
| 3,336,206 | 8/1967 | Tozo Sasaki et al. | 203—10 |
| 1,813,516 | 6/1931 | Dooley | 202—234 |
| 3,129,145 | 4/1964 | Hassler | 202—236 |
| 3,390,056 | 6/1968 | Ingram | 202—234 |
| 2,402,737 | 6/1946 | Delano | 202—234 |
| 2,412,466 | 12/1946 | Miller | 202—234 |
| 2,445,350 | 7/1948 | Ginnings | 202—234 |
| 2,820,744 | 4/1958 | Lighter | 202—234 |

OTHER REFERENCES

Advances in Chemistry Series #27, Saline Water Conversion, Hassler & McCutchan, "Osmosis Through a Vapor Gap Supported by Capillarity," April 1960, pp. 192–193.

NORMAN YUDKOFE, Primary Examiner

D. SANDERS, Assistant Examiner

U.S. Cl. X.R.

203—10; 202—234